Nov. 10, 1953  H. C. CHRISTIANCE  2,658,396
CAM AND LEVER ACTUATING MECHANISM
Filed May 1, 1950  2 Sheets-Sheet 2
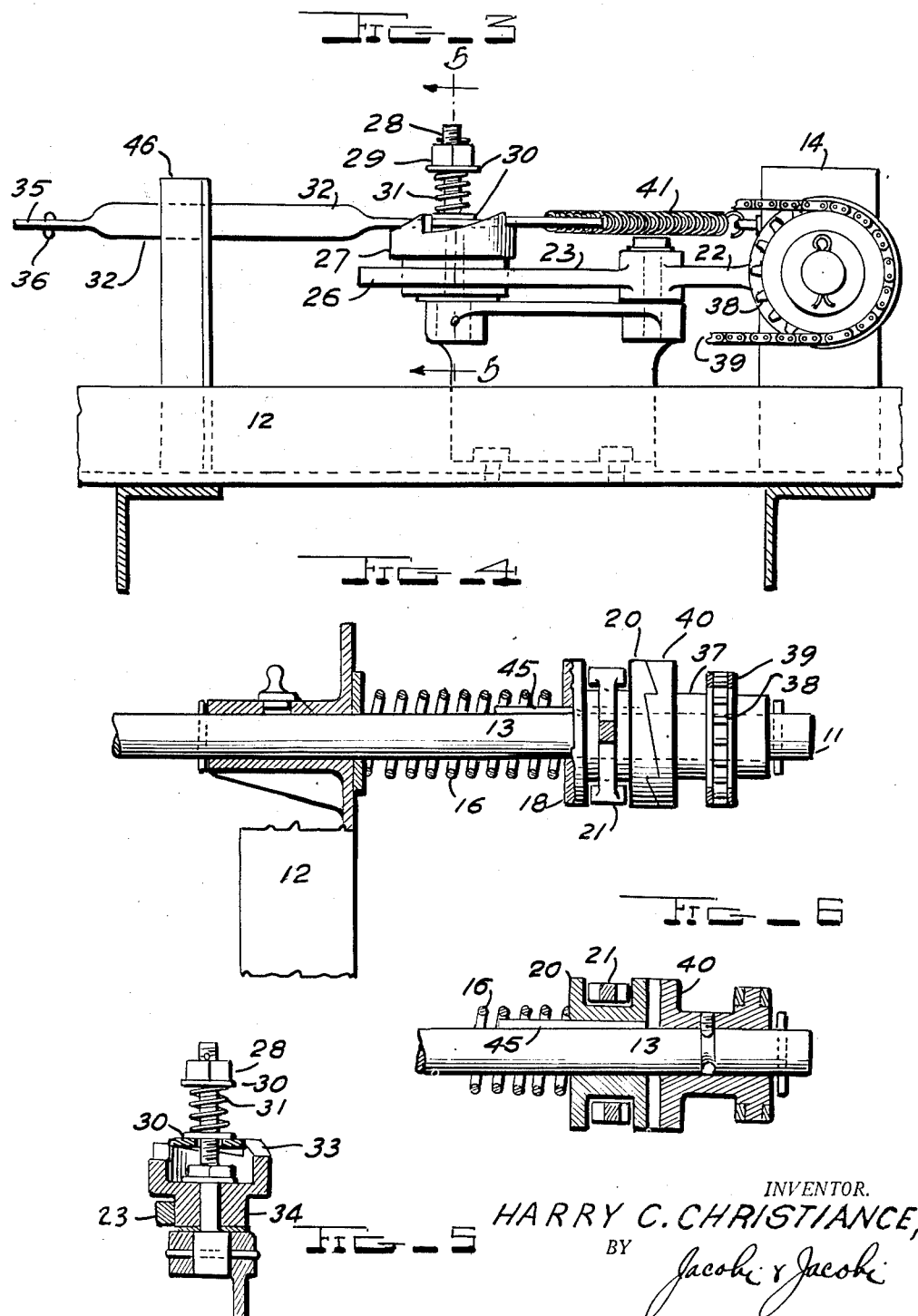
INVENTOR.
HARRY C. CHRISTIANCE,
BY Jacobi & Jacobi
ATTORNEYS Patented Nov. 10, 1953

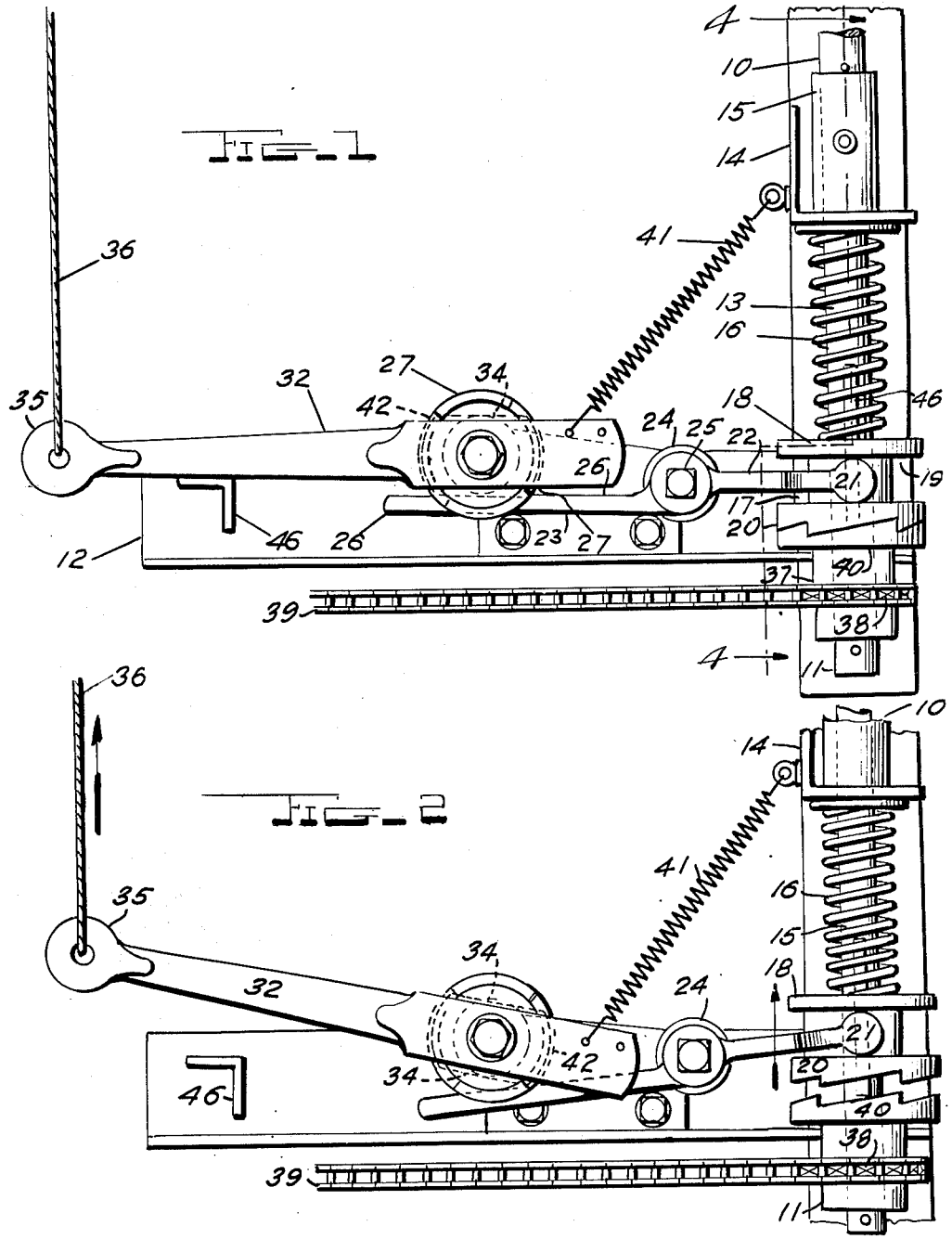

2,658,396

UNITED STATES PATENT OFFICE 2,658,396

CAM AND LEVER ACTUATING MECHANISM

Harry C. Christiance, West Brooklyn, Ill.

Application May 1, 1950, Serial No. 159,364

1 Claim. (Cl. 74—96)

This invention relates to power transmission machinery and more particularly to mechanical clutches for engaging and disengaging aligned shafts so the power of one may be transmitted therethrough to the other in a conventional manner, expeditiously and effectively positive.

While clutches for the mechanical transmission of power from one shaft to another, belong to an art that has been relatively highly developed, they have in general certain limitations that affect their flexibility of use and capacity to perform their functions smoothly and quietly. This is due to a considerable extent to the mechanism of the shifting arm being in one rigid piece and requiring the use of a stiff leg to operate it. This in turn necessitates a certain amount of skill and care on the part of the operator lest he engage the teeth of the clutch elements in such a manner as to induce breakage thereof. In this invention, the structure included in the mechanism employed for shifting the clutch elements is of a unique character and involves several separated members that operate independently as individual items, but cooperate together to produce a movement in the elements that is fast, smooth and effective, while anticipating wear at the contacting surfaces.

It is therefore an object of this invention to provide a new and improved mechanical clutch device that will avoid, one or more, of the disadvantages and limitations of previous mechanisms used for clutching purposes. Another object of this invention is to provide a new and improved mechanical clutch that will include an effective shifter element that can be operated when a cable is pulled upon in order to swing the lever about its pivotal mounting.

A further object of the hereindescribed invention is to provide a new and improved mechanical clutch that will operate quickly, powerfully and smoothly and include provision for wear and replacement of parts as such requirements arise.

An additional object of the invention is to provide a new and improved mechanical clutch for transmitting power between separated and aligned shafts operable by a shifting mechanism composed of several separable parts operating independently as individual items but coordinated and cooperatively connected with one another to produce an effective movement in the clutch elements through a limited travel, yet positively located in their engaged and disengaged positions to prevent excessive stresses on them.

Other objects of the invention will be apparent as it is disclosed in more detail.

For a better understanding of the invention, its objects, principles and the operation thereof, reference is made to the accompanying drawings. These drawings together with the following description outline a particular form of the invention, by way of example, and not of limitation, while the scope of the invention is emphasized in the claim.

Referring to the drawings in which:

Figure 1 is a plan view of a mechanical clutch, embodying this invention; and in its engaged position;

Figure 2 is a similar view with the clutch in its disengaged position;

Figure 3 is a side elevation of the clutch shown in Figure 1.

Figure 4 is a sectional detail of the clutch elements of the device on line 4—4 of Figure 1.

Figure 5 is a sectional detail on line 5—5 of Figure 3 of the ratchet coupling used in the device and Figure 6 is a detail in section of a side view of the shifter portion of the device.

Similar reference characters refer to the same parts throughout the drawings.

The construction shown in the drawings is that of a mechanical clutch applied to a conventional piece of agricultural equipment and is employed to engage and disengage power from a rotating drive shaft 10, to a driven shaft 11, both aligned with one another in the same plane. The clutch assembly consists of a frame 12 of angular form supporting the drive shaft 10 which passes through a bracket 14 and through a bearing 15 carried thereby and in which the shaft turns during its operation. A coil spring 16 is interposed between the bracket 14 and a shifter collar 17. The shifter collar 17, slides along the shaft 10 freely, except as restrained by the compression tension of the spring 16 on its flange 18, which it contacts. The shifter collar 17, consists of a circular body having a large groove 19 cut peripherally in it and leaving a plain flange 18 on one side and a ratchet toothed flange 20 on the other. The groove 19, is made large enough to carry the forked head 21 of a shifter lever 22 that forms the collar actuating member of a centrally fulcrumed lever 23 pivoted on a bushing 24 and pin 25. The pin and bushing are mounted on the frame 12 and retain the lever in a stationary position thereon, with its rear arm 26 projected backwards away from the power shaft 13. The lever movement is restricted in its arcuate travel by overlapping abutting engagement with a side portion of a cam stub of disk 27 mounted loosely on a bolt like stem 28 so it may revolve thereon. A nut 29, washers 30 and spring 31 provide suitable operative tension to enable a shifter lever 32 pivoted upon the pin 28 to move up and down along the pin during pivotal movement about the pin. The lever 32 is flattened and sized to fit between two of the ratchet teeth 33 integrally combined with and projecting upwardly from the cam disk. The cam stub 27, is of cylindrical material and has a pair of flat surfaces 34 formed opposite each other to press flat against the flat transverse sides of the extending arm 26 during a 180 degree rotative travel of its cam. The extending arm of the lever 32, has a perforated end portion 35 arranged for the attachment of a cable 36 thereto for pulling the shifter arm mechanism.

The shifter collar 17 engages with another collar 37 including a ratchet toothed flange 40 faced to engage and lock with the ratchet teeth of the flange 20 of the collar 17, in one direction of rotation and ride on it in the opposite. A sprocket gear 38 is secured to the collar 37 and rotates therewith and during its rotation carries the chain 39 with it so as to operate extraneous mechanism. A coil spring 41 is attached to the bracket 14 at one end and to the lever 32 at the other to take up the slack in the cable 36 and keep the cam 27 into contact with the lever 32 suitably tensioned to prevent undue movement between them.

The operation of the clutch actuating mechanism of this invention is relatively simple and insofar as the operator is concerned involves only the pulling and releasing of cable 36. Assuming the clutch members 20 and 40 to be engaged as shown in Fig. 1, and further assuming that it is desired to disengage the clutch members and interrupt drive from the shaft 10 to the shaft 11 the operator exerts a pull on cable 36 which serves to pivot the actuating lever 32 in a clockwise direction as viewed in Figs. 1 and 2 about the pivot 28. Since the actuating lever 32 is in engagement with the ratchet teeth 33 pivotal movement of the same will cause rotation of the cam stub 27 and rotation of the flat sided cam 34 carried thereby.

This operation results in rotating the cam 34 through an arc of substantially 90° and causes engagement of an arcuate surface of the cam 34 with the clutch engaging lever 22 moving this lever to the position shown in Fig. 2 thus causing slidable movement of the clutch member 20 on the shaft 13 and key 45 away from clutch member 40 resulting in disengagement of such clutch members and interruption of the drive.

Release of tension on the cable 36 will result in the actuating lever 32 returning to the position shown in Fig. 1 under the action of tension spring 41, cam 34 remaining stationary by reason of the friction between the same and lever 22. During this movement of actuating lever 32 and at the same time, actuating lever 32 will be cammed away from the cam stub 27 by the inclined surfaces of the ratchet teeth 33 against the action of compression spring 31 until passing the lips of the next ratchet teeth 33 whereupon the actuating lever 32 will be moved toward the cam stub 27 by the action of spring 31 in order to engage the next succeeding pair of ratchet teeth 33.

The clutch members 20 and 40 will remain disengaged until a pull is again exerted upon cable 36 whereupon the cam 34 will be rotated until the clutch lever 22 engages the opposite flat on the cam 34 thus permitting clutch member 20 to move into engagement with clutch member 40 under the action of compression spring 16.

It will be apparent from the above that the clutch actuating mechanism of this invention operates to alternately engage and disengage clutch members merely by exerting a pull on a cable which may be led to any desired remote point and that the clutch will remain in engaged or disengaged condition, as the case may be, without further attention from the operator.

It will be obvious to those skilled in the art that various changes may be made in the invention without departing from the spirit and scope thereof and therefore the invention is not limited by that which is shown in the drawing and described in the specification but only as indicated in the appended claim.

Having thus described the invention, what is claimed is:

An actuator for a clutch comprising a support, pins carried by and projecting upwardly from said support in transversely spaced relation to each other, a clutch engaging lever pivotally mounted about one pin and having a clutch-engaging portion and a handle extending laterally therefrom towards the other pin in crossing relation to a side thereof, the second pin being elongated and constituting a stem and being threaded from its upper end for a portion of its length, a cam member having a shank rotatable about the lower portion of said stem and having its lower end bearing against the support, a head at the upper end of said shank projecting radially therefrom and about its periphery carrying an upstanding annular wall defining a pocket having an upper surface and formed along its upper edge with circumferentially extending ratchet teeth, said shank having flat side faces and circumferentially extending arcuate surfaces between the flat faces, said handle bearing against the shank between the support and the projecting portion of the head, a nut secured upon said stem from the upper end thereof and disposed in the pocket and engaging the upper surface and rotatably holding the cam member about the stem, an actuating lever pivotally mounted about said stem over the cam member and extending across the toothed upper edge of said wall and radially from the cam member, a spring about said stem resting against said actuating lever, and a nut upon the upper portion of said stem compressing said spring and applying tension to the spring to yieldably hold the actuating lever in operative engagement with the ratchet teeth of the wall whereby the actuating lever may impart turning movement to the cam member when oscillated about the stem and the flat faces and arcuate surfaces of the shank impart oscillating movement to the clutch engaging lever.

HARRY C. CHRISTIANCE.

References Cited in the file of this patent

UNITED STATES PATENTS

| Number | Name | Date |
|---|---|---|
| 268,934 | Pond | Dec. 12, 1882 |
| 350,525 | Brownell | Oct. 12, 1886 |
| 1,371,251 | Larson | Mar. 15, 1921 |
| 1,544,876 | Amstutz | July 7, 1925 |
| 1,812,157 | Leopold | June 30, 1931 |
| 2,092,104 | Bowden | Sept. 7, 1937 |
| 2,336,099 | Hyland | Dec. 7, 1943 |
| 2,352,596 | Bartlett et al. | July 4, 1944 |
| 2,367,076 | Varblow | Jan. 9, 1945 |
| 2,423,043 | Oldstad | June 24, 1947 |
| 2,517,744 | Wallach et al. | Aug. 8, 1950 |